May 7, 1963
J. T. KINNEY
3,089,022
WELD ROD GUIDE
Filed May 8, 1961
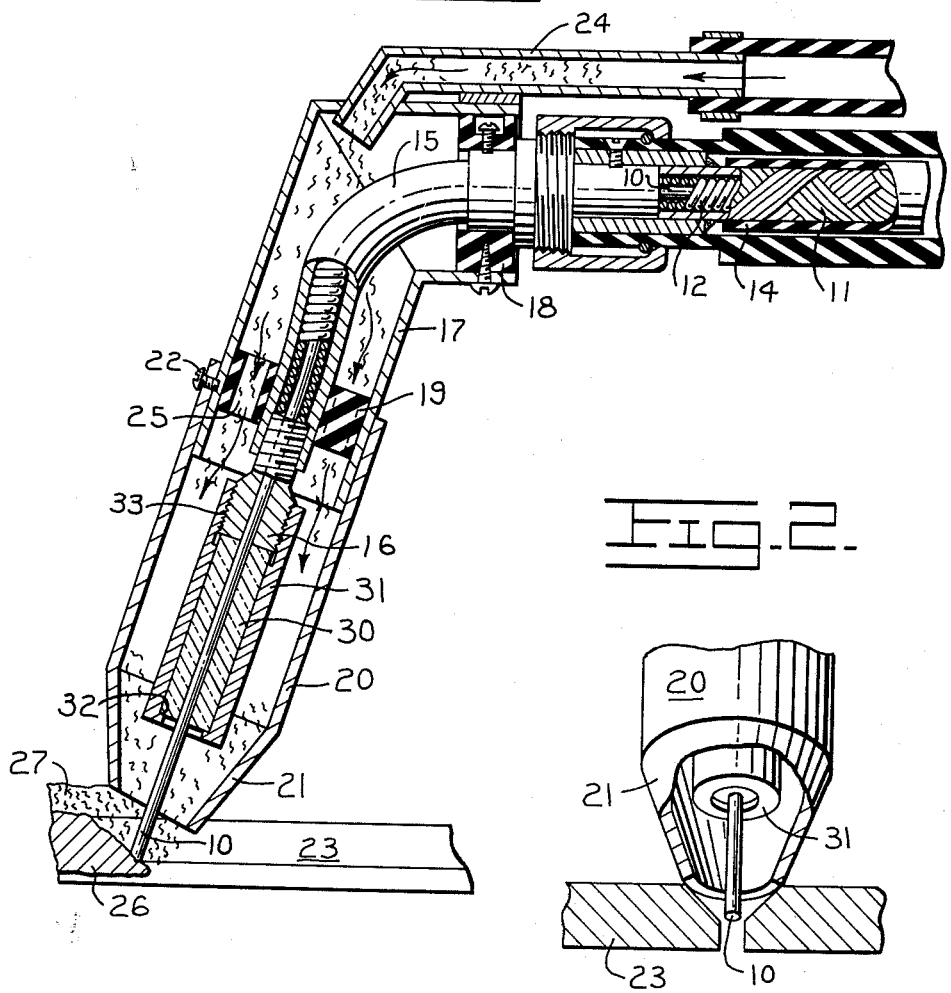
INVENTOR.
JOHN T. KINNEY
BY
ATTORNEYS

3,089,022
WELD ROD GUIDE
John T. Kinney, Peoria, Ill., assignor to Caterpillar Tractor Co., Peoria, Ill., a corporation of California
Filed May 8, 1961, Ser. No. 108,576
3 Claims. (Cl. 219—130)

This invention relates to electric arc welding apparatus and, more particularly, to a weld rod guide in such apparatus for feeding weld wire or rod along a guided path despite a loss of rigidity in the wire occasioned by heating it close to its melting point. This application is a continuation-in-part of my copending application Serial No. 835,797 filed August 24, 1959, now Patent No. 3,025,-387, dated March 13, 1962.

In some electric arc welding methods, a consumable electrode is fed continuously through an electrical contact point to establish an electric arc between the end of an electrode and the piece being welded. A substantial increase in the rate of deposition of the weld metal has been realized by increasing the length of the portion of the weld rod that extends beyond the electrical contact, so that the resultant increased resistance in this terminal portion effects a preheating of the wire. The rate of weld metal deposition increases if the weld rod is preheated near its melting point but the resultant loss of rigidity renders the wire easily susceptible to distortion and difficult to guide.

It is, therefore, an object of this invention to provide means adaptable to a standard type of welding gun capable of guiding the terminal portion of a preheated weld wire from the electrical contact to the spot of the weld.

Further and more specific objects and advantages of this invention are made apparent in the following specification when read in connection with the accompanying drawing wherein:

FIG. 1 is a central vertical longitudinal section through a conventional type weld gun with a weld rod guide embodying the present invention; and FIG. 2 is a fragmentary view in front elevation of a portion of the gun embodying features of this invention.

In the drawing, a weld rod or wire 10 is shown being fed through a conducting cable 11 carrying a coiled element 12 of steel or the like through which the weld rod may slide. The cable is suitably insulated as indicated at 14 and connected by conventional adaptors to a goose neck 15 into the end of which is threaded an electrical contact member 16. The goose neck 15 and contact member 16 are secured within a housing 17 by insulating spacers 18 and 19. A nozzle fitting 20 having a tapered end portion 21 is telescopically carried on the open end of the housing 17 and adjustably positioned thereon by set screws 22 to control the length of weld rod 10 extending beyond the contact piece 16 but within the nozzle 20 before being exposed to and consumed in the arc between its end and the work piece 23. In some instances, as where a weld is being made in a V gap as in FIG. 2, the nozzle end 21 may be supported and guided along the work piece to provide positive control of the terminal length of weld rod, as well as to assure its central deposition in the gap.

The weld rod is automatically advanced through the gun by conventional mechanism, not shown, and granular flux is fed as by pressure into the housing 17 by means of a tube 24 so that it passes downwardly through the housing through ports 25 formed in the spacer 19 and is free to flow through the end of the gun insuring that the weld material is deposited as illustrated at 26 under a coating of a granular flux material 27 to effect what is referred to as submerged arc welding.

In conjunction with the adjustable nozzle 20 and the feeding means for delivering continuously a controlled length of weld rod, I provide a tubular guide 30 of dielectric heat resistant material secured directly to the electric contact member 16 to form an extension thereof. The guide member 30 may be made of aluminum oxide or high melting point ceramic such as stabilized zirconia or high temperature porcelain and has a bore therethrough slightly larger, about .010 inch, than the diameter of the electrode in order snugly to embrace the expanded electrode and to stabilize and support it while permitting it to slide through freely.

The rod guide 30 is carried within a jacket 31 of heat conductive material such as copper, being supported on internal shoulders 32 at the lower end thereof. The dielectric, heat resistant guide 30 and the heat conductive jacket 31 are secured together to the contact member 16 by any suitable means such as a threaded connection 33 between the upper end of the jacket and the contact member 16. The high conductive characteristics of the shielding jacket 31 permit it to absorb and dissipate abrupt heat changes developed by the welding arc and thereby to protect the ceramic against thermal shock which could otherwise cause early failure. Moreover, even if a ceramic guide is cracked, it may be used for a considerable length of time because all but fine pieces are held together by the jacket 31 within which the guide is encased.

The foregoing disclosure of the invention is merely illustrative and explanatory thereof, and various changes in the size, shape and materials, as well as in the details of the illustrated construction, may be made within the spirit and scope of the invention which is defined by the claims appended hereto.

Having described my invention I claim:
1. In a welding machine having an electrical contact member through which a weld wire is fed to produce an arc between the end of said weld wire and a work piece,
    said wire being fed to maintain the said end beyond said electrical contact a sufficient distance that the resistance of the wire effects heating thereof to a temperature which greatly reduces its rigidity,
    the combination therewith of:
    a tubular guide of dielectric heat resistant material having a passageway therethrough adapted snugly but slidably to receive a weld wire,
    a tubular jacket of thermal conductive material snugly embracing said tubular guide and arranged closely adjacent to the end of said weld wire for protecting said tubular guide against thermal shock,
    an internal shoulder at one end of said jacket supporting said tubular guide, and
    means on the other end of said jacket securing said jacket on said electrical contact member to extend therefrom so that said weld wire may be fed through said passageway.
2. In a welding machine having an electrical contact member through which a weld wire is fed, the arrangement of an end of said wire relative to a work piece being sufficient to create an arc to effect softening of said wire through heating, the combination therewith of:
    a tubular guide of a dielectric heat resistant material having a passageway therethrough adapted snugly but slidably to receive said weld wire,
    a jacket of thermal conductive material encircling and engaging said tubular guide, said jacket directly contacting said tubular guide and arranged closely adjacent to the end of said wire whereby said jacket of thermal conductive material protects said tubular guide of dielectric heat resistant material by absorbing and dissipating abrupt heat changes developed by the welding arc, and means for securing said jacket and tubular guide on said electrical contact member to form a coaxial extension thereof.

3. The combination defined in claim 2 including an extensible tubular nozzle housing surrounding said jacket and tubular guide in substantially concentric relationship thereto.

References Cited in the file of this patent

UNITED STATES PATENTS

| | | |
|---|---|---|
| 2,295,546 | Cambridge | Sept. 15, 1942 |
| 2,401,383 | Wilson | June 4, 1946 |
| 2,965,746 | Cresswell | Dec. 20, 1960 |
| 3,018,360 | Engel | Jan. 23, 1962 |